United States Patent [19]

Cason, III et al.

[11] 4,196,399

[45] Apr. 1, 1980

[54] REPETITIVELY PULSED, COLD CATHODE E-BEAM, SELF-SWITCH LASER

[75] Inventors: Charles M. Cason, III; George J. Dezenberg, both of Huntsville, Ala.

[73] Assignee: The United States of America as represented by the Secretary of the Army, Washington, D.C.

[21] Appl. No.: 867,743

[22] Filed: Jan. 9, 1978

[51] Int. Cl.² .............................................. H01S 3/00
[52] U.S. Cl. ........................ 331/94.5 G; 331/94.5 PE
[58] Field of Search ................. 331/94.5 G, 94.5 PE, 331/94.5 D, 94.5 T

[56] References Cited

U.S. PATENT DOCUMENTS

| | | | |
|---|---|---|---|
| 3,720,885 | 3/1973 | Koloc | 331/94.5 D |
| 3,828,274 | 8/1974 | Krawetz | 331/94.5 PE |
| 3,970,962 | 7/1976 | Peressini et al. | 331/94.5 PE |

*Primary Examiner*—James W. Davie
*Attorney, Agent, or Firm*—Nathan Edelberg; Robert P. Gibson; James T. Deaton

[57] ABSTRACT

A high power repetitively pulsed gas laser which has a cold cathode e-beam gun to control self-switching circuitry for applying electric power throughout a confined discharge cavity exciting laser atoms or molecules to cause a high power laser output to be produced from the laser gas mixture in the discharge cavity.

6 Claims, 3 Drawing Figures

REPETITIVELY PULSED, COLD CATHODE E-BEAM, SELF-SWITCH LASER

DEDICATORY CLAUSE

The invention described herein may be manufactured, used, and licensed by or for the Government for governmental purposes without the payment to us of any royalties thereon.

BACKGROUND OF THE INVENTION

In the past, various systems for applying high voltage power throughout a laser cavity have been utilized, but these systems have not always been efficient on the electrical power being used and they have not had the capability of being easily controlled as with the cold cathode e-beam gun approach.

Accordingly, it is an object of this invention to provide a high power laser that is controlled by a repetitively pulsed, cold cathode e-beam mechanism to have the capability of producing high power pulsed outputs.

Another object of this invention is to provide a gas laser that has a laser cavity therein that confines the laser gas to the cavity as the laser gas is caused to lase by the high power being applied thereacross.

A further object of this invention is to provide an effective means for attenuating the acoustic waves generated when pulsing the e-beam to cause the laser discharge produced by the rapid heating of the laser gas due to the large density of input electric power to the laser gas.

Further objects and advantages of this invention will be obvious to those skilled in this art.

SUMMARY OF THE INVENTION

In accordance with this invention, a continuous flow laser device is disclosed which has a laser cavity with ceramic structures at the entrance and exit to the cavity to isolate and define the laser cavity and prevent transverse spreading of an electron beam when applied thereacross. The laser cavity has a high powered voltage applied thereacross at all times and this voltage is maintained below the breakdown voltage of the laser gas mixture flowing through the laser cavity. The laser cavity gas is bombarded by fast electrons from a cold cathode e-beam gun powered by a pulse forming network. The e-beam generates electron secondaries to cause sufficient power to be applied to the lasing gas within the optical cavity to cause the lasing gas mixture to conduct electric currents, for pumping and lasing. As the power is applied across the laser cavity, the voltage across the pumping capacitor drops which automatically provides a condition in which the device will be automatically cut off and self-switched when the cold cathode e-beam gun is switched off. With this type arrangement, very high power laser output can be obtained with many cycles per second without the need for high current discharge.

DESCRIPTION OF THE PREFERRED EMBODIMENT

Figure 1:
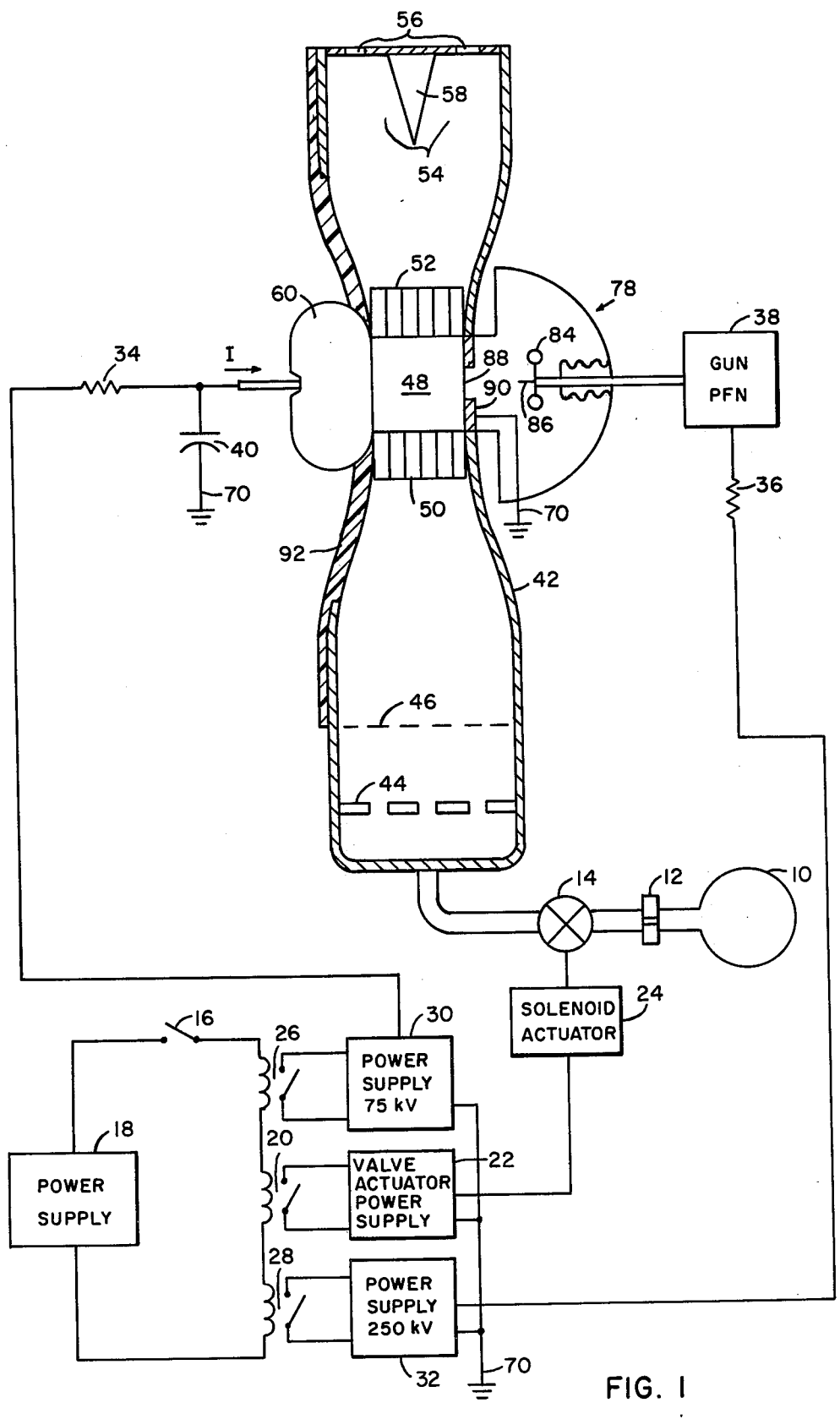
FIG. 1 is a schematic view of a laser system in accordance with this invention.

Referring now to the drawings, FIG. 1 shows a laser system in accordance with this invention and includes a conventional laser gas mixture containing $CO_2$ under high pressure in container 10 at about 3000 psi (140 cubic feet). Laser gas flow rate is controlled by sonic orifice plate 12 and control valve 14. Orifice plate 12 is designed to emit about 15 pounds/second of the mixture containing $CO_2$, a laser molecule. Control valve 14 is actuated by master control switch 16 through power supply 18 that energizes relay 20 which interconnects power supply 22 across solenoid actuator 24 which causes valve 14 to be actuated. Relays 26 and 28 are also simultaneously energized with relay 20 to energize or interconnect power supply 30 (75 kV, 1 megawatt) through resistor 34 to discharge capacitor 40 and power supply 32 (250 kV, 500 kW) through resistor 36 to e-beam gun PFN 38 (pulse forming network). Laser housing 42 has laser gas baffle plate 44 which spreads the flow as it approaches the final large area sonic orifice plate 46 to provide high quality flow medium homogeneity. The laser gas flows through laser cavity discharge cavity 48 defined between ceramic honeycomb members 50 and 52 and then up through channels 54 and finally out ports 56. Channels 54 are divided by wedge attenuators 58 which absorb acoustic energy that is generated by shock waves that are propagated up to wedge 58.

Figure 2:
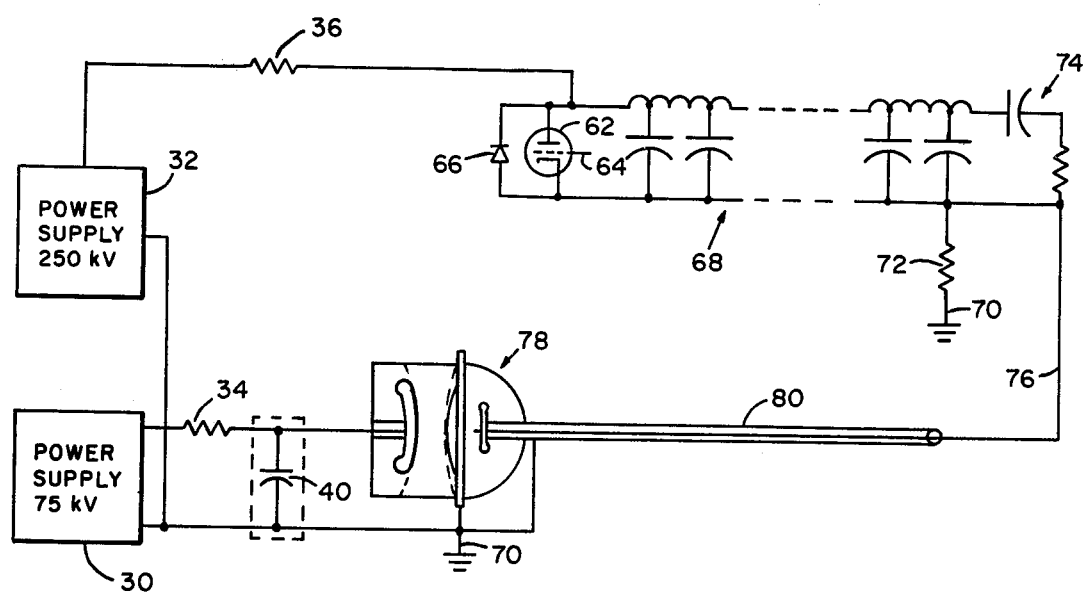
FIG. 2 is a schematic illustration illustrating the pulse forming network in more detail.
Figure 3:
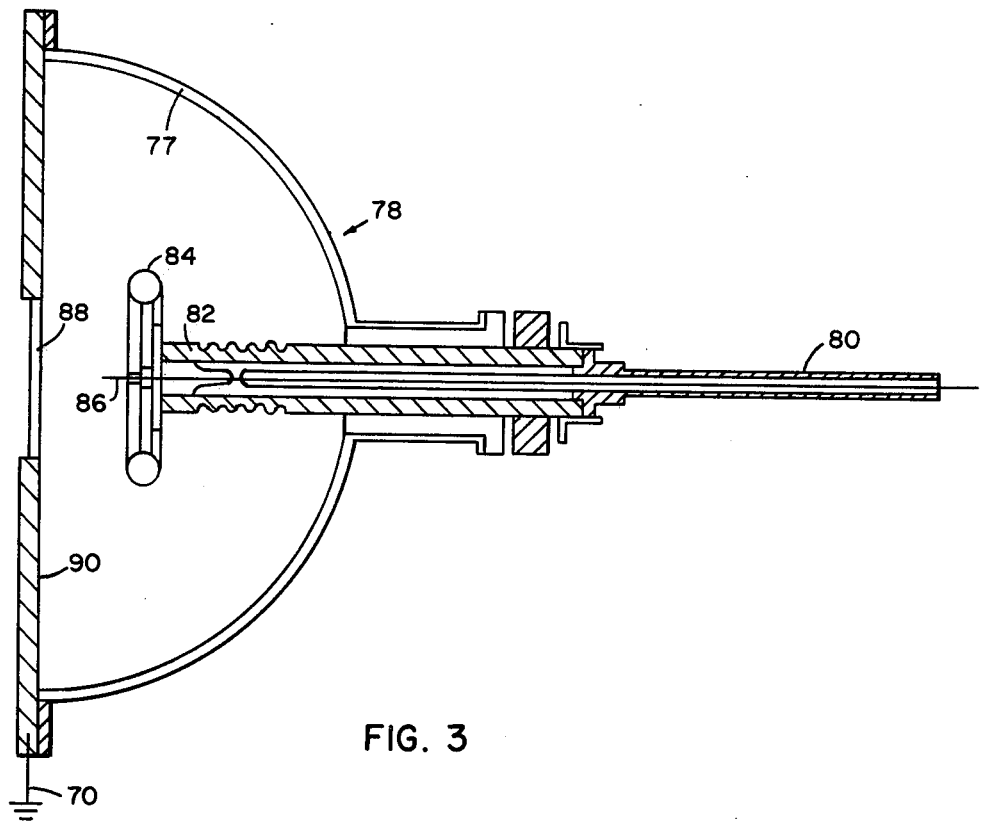
FIG. 3 is a schematic cross-sectional view of the cold cathode e-beam gun used in this invention.

Power supply 30 is connected through resistor 34 to charge the laser pumping capacitor 40 to provide power for the discharge high voltage electrode 60. Discharge capacitor 40 has a value of 14 $\mu$Fd and is charged through resistance 34 to limit the recharge time of capacitor 40. Power supply 32 is connected through resistance 36 to gun PFN 38 to charge the gun PFN. The e-beam gun PFN 38 is controlled by thyratron 62 (see FIG. 2) which in turn is gated on and off at 64 with a conventional Hewlett-Packard pulse generator. A front-end clipper diode 66 is placed across thyratron 62 to protect the thyratron. An inductance-capacitance bank 68 is a pulse forming network which is also connected to the power supply and to common ground 70 through high resistance isolation resistor 72. A capacitor-resistance 74 is placed as an end of line termination for the inductance-capacitance bank. Output 76 is connected to the cold cathode field emitter of e-gun 78. Output lead 76 is led through a conventional shielded cable 80 that has the shield connected to common ground 70 of the system. The e-gun (see FIG. 3) has an oil filled high voltage bushing feed/support 82 that supports the cathode made of corona rings 84 and a ½ mil thick tantalum foil 86 which serves as the electron emitter in its cold (unheated) state. Adjacent electron emitter 86 is foil window 88 that is supported by ground plane 90 that is connected to common ground 70 of the system. Foil 88, e-gun housing 77, and member 90 serve to close the gun chamber to form a vacuum from the atmosphere where the e-gun is attached. Laser chamber 48 is the high gas velocity section of the flow channel. On the opposite side of laser chamber 48 a dielectric fairing 92 (see FIG. 1) is used to electrically isolate high voltage electrode 60 from ground.

Ceramic honeycomb attenuators 50 and 52 have a porosity of about 4 to about 300 cells per inch and are used to isolate and define the discharge or laser cavity 48 by preventing transverse spreading of the e-beam from the e-gun. Honeycomb structures 50 and 52 are also an effective means to attenuate the acoustic waves generated by pulsing the e-beam and discharge power. Input energy up to 250 J/liter causes an instantaneous temperature jump in region 48 by about 250° C., forming supersonic shock waves. About one-third of the input energy is contained within the shock waves. A honeycomb structure with 16 cells/inch$^2$ gives good e-beam control against transverse spreading but poor acoustic attenuation. A honeycomb structure with 100–1000 cells/inch$^2$ gives both good e-beam control and good acoustic attenuation provided the honeycomb cells are about 5 inches long. The porosity of this structure would be about 40 percent due to the cell wall thickness. The laser gas flow is through the honeycomb structure which has a porosity range between about 25 percent to about 75 percent with the optimum value being about 45 percent depending on the gas flow velocity. Velocities of the gas are usually about Mach 0.05 to Mach 0.25 with the higher velocity producing the most pressure drop across the honeycomb. In an application as disclosed herein the application is for repetitively pulsed operation where the acoustic disturbance of all previous pulses must be attenuated down to a level of gas density fluctuation, RMS$\Delta\rho/\rho$, of about $5 \times 10^{-4}$ at one or more atmospheres. Additional applications include other gas mixtures containing laser molecules such as KrF, XeF and HgCl. These gases can be operated at pressures above and below one atmosphere and in closed cycle laser gas circulation systems. In some cases, the high current e-beam alone can direct pump the laser gas, thereby the capacitor 40, its circuitry and electrode 60 are not needed. The acoustic components, shields 50 and 52 and attenuators 58 in chamber 54 are still required.

In operation, discharge action of the laser is accomplished by depressing control switch 16 to open gas valve 14 and activate power supplies 30 and 32. With power supply 30 connected, discharge capacitor 40 is charged to 75 kV through resistance 34 to limit the recharge time. As capacitor 40 is charged, the gun PFN 38 is simultaneously being charged from power supply 32 to the 250 kV. At the same time, laser gas from source 10 is flowing through laser chamber 48. Thyratron 62 is triggered on and PFN 68 fires sending a high voltage wave into e-gun 78 ($10^{-4}$ to $10^{-6}$ Torr chamber pressure) through output 76 and bushing feed/support 82 to the cathode made of corona rings 84 and to a ¼ mil thick tantalum foil strip 86 which serves as the electron emitter in its cold state. The applied voltage on electron emitter 86 produces a 10 million volts/centimeter field that causes electron emission that is at the Child-Langmuir space charge limit in the space between electron emitter 86 and foil window 88. The electron beam passes through foil window 88 (15-cm×200-cm) at about 0.05 amp/cm$^2$ into laser gas space 48 creating a cold plasma having an electron density of $5 \times 10^{13}$/cm$^3$. This plasma generated in the laser gas of space 48 becomes a conductor of an electric current because it is within an initial applied voltage, $V_o$, from capacitor 40 of 75 kV across 15 cm to produce a field of 5 kV/cm. As current, I, is conducted from capacitor 40, its voltage, V, is decreased corresponding to the energy, E, extracted, where $E(t) = \int I(t)V(t)dt$ and the voltage, V(t), is $E(t) = \frac{1}{2}C(V_o^2 - [V(t)]^2)$. The energy extracted, $E(t)$, all goes into the laser gas in region 48. As energy moves from the capacitor 40 into the laser gas, the voltage goes from the initial voltage, $V_o$ to a lower level at time t, V(t). The requirement is for V(t) to be below the breakdown field after the applied acoustic wave causes the laser gas density to drop from $\rho_o$ the initial density at $t=0$ to $\rho$min after the e-beam is shut off and the rare fraction wave moves out. The requirement is for $V_o/\rho_o$ and Vmin/$\rho$min both to be below the gas breakdown for self-switching to work.

The e-beam gun therefore acts as a turn-on, turn-off switch for a heavy current, 30,000–50,000 amperes at 50,000 to 75,000 volts. When the e-gun is shut off, the current conduction rapidly comes to a halt as the free electron density rapidly disappears due to recombination. This happens in about 1–2 microseconds. Current conduction requires a large density of free electrons, $n_e$. Free electrons are produced by the fast e-beam electrons colliding with the gas molecules in the laser cavity. The production rate is S. Electrons decay due to radiative recombinations with positive ions at a rate, k. The equation to be solved is $$dn_e/dt = S - kn_e^2, \tag{1}$$

which states for equilibrium $$n_e = S/k. \tag{2}$$

When the e-beam is turned off, then S=0 and the equilibrium value of $n_e$ rapidly decays to approach zero. Current conduction, J, in the laser gas, $$J = en_e V_D \tag{3}$$

where the drift velocity, $V_D$, is a function of the applied field and e is the charge per electron. For a constant applied field, $V_D$ is a constant and J depends linearly on $n_e$. Turning off the e-beam at thyratron 62 causes $n_e$ to rapidly decrease and turning-off the discharge current conduction, J in equation (3).

Gas breakdown occurs at a value of the applied electric field per molecule, E/N, of about $3 \times 10^{-16}$ V/cm$^2$. This occurs at about 7,500 volts/cm at 1 atmosphere of gas pressure. The laser operates as low as about 5,000 volts/cm or an E/N of about $2 \times 10^{-16}$ V/cm$^2$. Thus, when the e-beam is turned on, the capacitor 40 voltage, initially at 75 kV over 15 cm, is reduced as charge is removed from the capacitor. Energy deposited in the gas causes it to be heated thereby increasing the local temperature and pressure. This causes a gas expansion to match the lower pressure. As the gas expands the density is reduced from $2.4 \times 10^{19}$/cm$^3$ to $1.6 \times 10^{19}$ cm$^3$. A value of capacitance for capacitor 40 is chosen such that as the energy is input to the gas the voltage drops from 75,000 volts to 50,000 volts. At e-beam cutoff, the value of E/N of $2 \times 10^{-16}$ V/cm$^2$ is not exceeded because the applied voltage across the laser is reduced in the same proportion as is the gas density allowing self-switching to occur.

The combined action of the e-beam in region 48 and laser capacitor 40 operates in a self-switched mode. Energy is efficiently input to the gas at a high pumping rate and the e-beam, when turned off, switches off the laser input power due to rapid recombination that takes place. High current, high voltage switches that can interrupt the current flow are therefore avoided. These high current switches are used in various pulse forming networks in other high power pulsed lasers. This invention has been operated in single pulse and in repetitively pulse modes up to 50 Hz. The operating frequency is presently limited to the 1 MW power supply availability.

Chamber 48 of laser housing 42 has a conventional type laser output for the laser beam produced from the laser gas being excited in chamber 48.

We claim:

1. In a high powered gas laser comprising a housing having a flow channel therethrough for the flow of a laser gas mixture, said flow channel having a laser chamber therein that is defined by said housing and porous means at opposite ends of the laser chamber through which the laser gas must flow, said porous means being such as to prevent transverse spreading of electrons from said laser chamber and to act as an effective means to attenuate acoustic waves that are generated, means for applying a high power voltage across said laser chamber at a potential that is below the breakdown voltage of said laser gas mixture, and a cold cathode e-beam device mounted adjacent said laser chamber and circuit means for applying a potential to said e-beam device to provide a potential to said laser gas mixture sufficient to cause a current path to be established in the laser chamber for electric pumping to occur and therefrom a lasing action from the laser mixture, said potential coupled through said e-beam device and said high power voltage discharging through said laser chamber for providing lasing action, and said means for applying said high power voltage causing a drop in value thereof while discharging through said laser chamber so that said laser will self-switch when said e-beam device is cut-off due to said high power voltage dropping to a potential that is below a voltage capable of maintaining a discharge and lasing action from the laser mixture.

2. In a high powered laser device as set forth in claim 1, wherein said porous means is a ceramic honeycomb structure with a porosity of between about 25 percent and 75 percent.

3. In a high powered laser device as set forth in claim 1, wherein said means for applying a high power voltage across said chamber and said circuit means for said e-beam device are controlled by a central control device.

4. In a high powered laser device as set forth in claim 3, wherein said circuit means for said e-beam device has a gun pulse forming network for providing high potential pulse to said e-beam device and said pulse being controlled by a thyratron and its gating pulse means.

5. In a high powered gas laser comprising a housing having a flow channel therethrough for the flow of a laser gas mixture, said flow channel having a laser chamber therein that is defined by said housing and porous means at opposite ends of the laser chamber through which the laser gas must flow, said porous means being such as to prevent transverse spreading of electrons from said laser chamber and to act as an effective means to attenuate acoustic waves that are generated, and means for applying a varying potential across said laser chamber and including a cold cathode e-beam means mounted adjacent said laser chamber for causing direct pumping of the laser gas mixture and for causing the laser to operate in a repetitively pulse mode when said cold cathode e-beam means is switched on and off.

6. In a high powered laser device as set forth in claim 5, wherein said porous means is a ceramic honeycomb structure with a porosity of between about 25 percent and 75 percent.

* * * * *